United States Patent
Schiz et al.

(10) Patent No.: US 8,009,982 B2
(45) Date of Patent: Aug. 30, 2011

(54) ALARM SURVEILLANCE FOR CASCADED OPTICAL ACCESS

(75) Inventors: Alan Schiz, Edison, NJ (US); Mohammad A. Abidi, Manalapan, NJ (US); Donald R. Bozarth, Sacramento, CA (US); Soon Lau, Middlesex, NJ (US)

(73) Assignee: AT&T Intellectual Propery II, L.P, Atlanta, GA (US)

( * ) Notice: Subject to any disclaimer, the term of this patent is extended or adjusted under 35 U.S.C. 154(b) by 843 days.

(21) Appl. No.: 12/012,973

(22) Filed: Feb. 6, 2008

(65) Prior Publication Data

US 2009/0196601 A1    Aug. 6, 2009

(51) Int. Cl.
*H04B 10/08*    (2006.01)

(52) U.S. Cl. .................. 398/17; 398/10; 398/33
(58) Field of Classification Search .............. 398/10, 398/17, 33–35, 47, 75–76
See application file for complete search history.

(56) References Cited

U.S. PATENT DOCUMENTS

| | | | | |
|---|---|---|---|---|
| 6,188,701 | B1 * | 2/2001 | Tsukamoto et al. | 370/535 |
| 7,379,481 | B2 * | 5/2008 | Lipski et al. | 370/535 |
| 2003/0112832 | A1 * | 6/2003 | Tsukamoto | 370/535 |
| 2004/0240485 | A1 * | 12/2004 | Lipski et al. | 370/537 |

* cited by examiner

*Primary Examiner* — Dzung D Tran

(57) ABSTRACT

A system and method is disclosed that allows real-time processing of child OPOI and rider service alarms from a parent OPOI which determines if one or more STS alarms are associated with a rider service, a child OPOI, or a parent OPOI. The system and method performs in real-time processing intervals required for alarm surveillance in a telecommunications network.

14 Claims, 7 Drawing Sheets

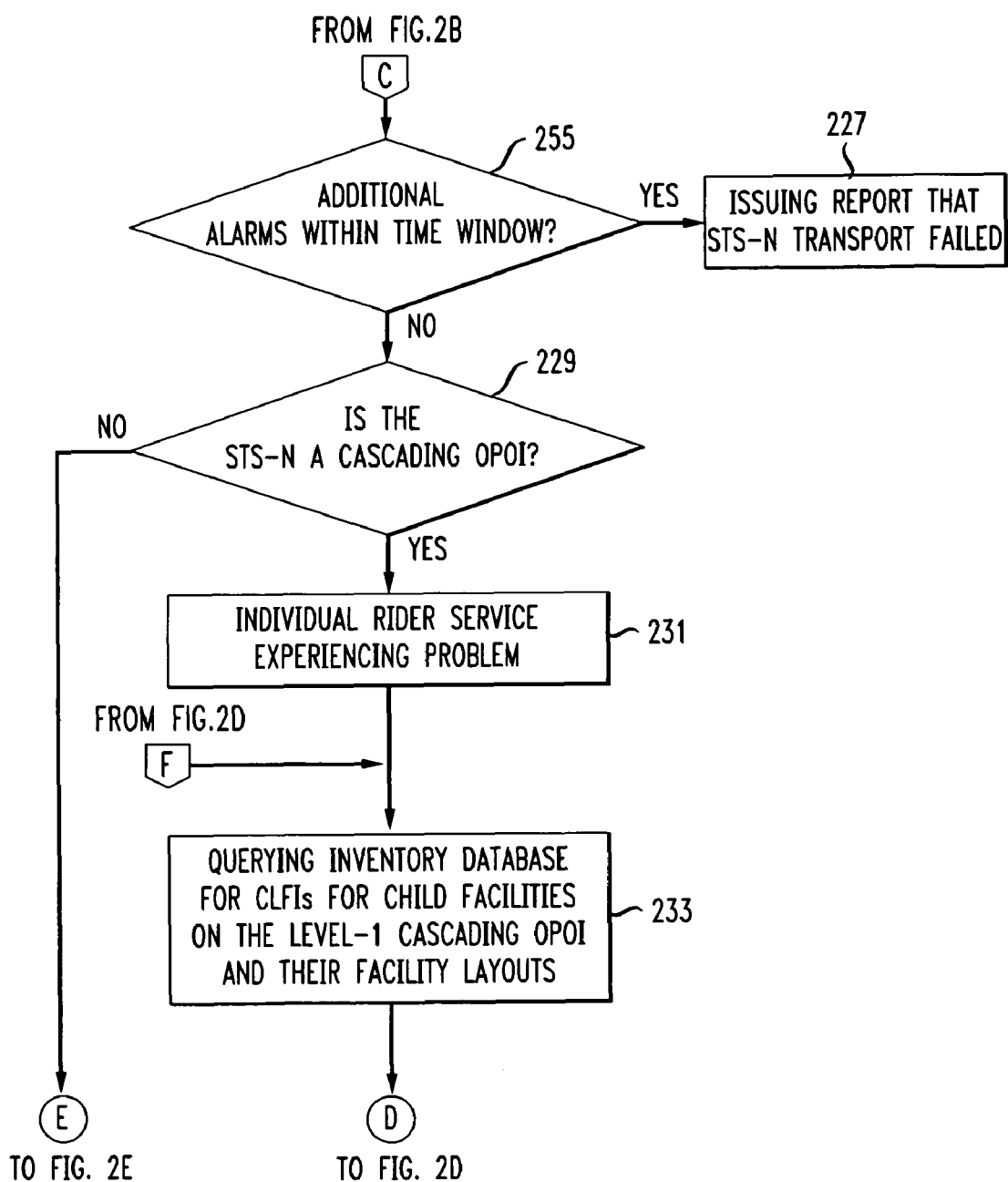

ALARM SURVEILLANCE FOR CASCADED OPTICAL ACCESS

BACKGROUND OF THE INVENTION

The invention relates generally to network communications. More specifically, the invention relates to a system and method of determining whether Synchronous Transport Signal (STS) alarms are associated with a rider service, a child Optical Point of Interface (OPOI) or a parent OPOI in digital signal circuits embedded in Synchronous Optical Networking (SONET), paths.

Wireline telephone companies are divided into two large categories, long distance (IntereXchange Carrier, or IXCs) and local (Local Exchange Carrier, or LECs, also known as Access Providers (APs)). An IXC carries voice and data traffic between telephone exchanges in different Local Access and Transport Areas (LATAs). Most voice traffic is digitized and is typically a data stream which may be intermixed with data traffic for digital data transmission.

There are major savings for an IXC to buy bulk optical access from an AP. In this arrangement, the Point of Interface (POI) between the IXC and AP is optical and is referred to as an Optical POI (OPOI). These OPOIs may carry optical signals such as SONET Synchronous Transport Signals (STS-N) or electrical customer circuits such as Digital Signal (DS3) services.

To maximize IXC economic benefits, a higher rate OPOI using an Optical Carrier (OC) such as OC-48 or OC-192 can carry lower rate OPOIs such as OC-3 or OC-12. This arrangement is known as cascaded OPOIs. Cascaded OPOIs allow an IXC to use OPOI access to AP/LEC end-offices that have IXC/AP traffic volumes insufficient to justify a higher rate OPOI. Unfortunately, the Network Assurance (NA) of a cascaded OPOI is not straightforward, in particular with respect to analysis of autonomous alarms. The goal of an alarm analysis is to determine the entity in trouble, that is the parent OPOI, the child OPOI, rider services on the parent OPOI, or rider services on the child OPOI.

For DS3 circuits carried in these layouts, SONET Network Elements (NEs) associated with the cascaded OPOI do not provide direct visibility to the IXCs for DS3 alarms or Performance Monitoring (PM) parameter data. Typically, there are no DS3 alarms available for a pure switched circuit-based network with an OPOI. However, an alarm on the STS-1 that carries the DS3 indicates that the DS3 has a problem.

An IXC may have bulk optical access, or OPOIs, with an AP. The optical access may be a multi-leveled, cascaded architecture where children OPOIs are located within parent OPOIs. Typical OPOI facilities can support child OPOIs as well as rider services across the parent OPOI. The child OPOIs can also carry additional child OPOIs and rider services. A rider service is an end-to-end STS or DS3 service which uses an OPOI for access to an AP. The rider service has a virtual POI with the AP, the STS-N timeslots on an OPOI versus a physical POI to the AP. The physical POI can be electrical for digital signals or optical for synchronous transport signals. The OPOIs are channelized SONET facilities, carrying STSs at different levels, (STS-N)/(Optical Carrier (OC-X)), where N/X=1, 3, 12, 48, etc. Alarms for a child OPOI and STS-N (non-concatenated) rider services are reflected as a series of STS-1 level alarms, not as a single STS-N alarm. However, for STS-Nc (concatenated) and DS3 rider services, there is just a single STS-1 alarm.

Cascaded optical access can provide a further access savings for an IXC. Cascading OPOIs allow lower bandwidth OPOIs, for example, OC-3, OC-12, to be economically feasible. However, a cascading OPOI needs to be maintained. There is the issue of analyzing and interpreting alarms associated with a cascading OPOI since the alarms arrive on a STS-1 level. An additional complication is the fact that an OPOI can have a cascading OPOI which in turn carries another cascading OPOI.

What is desired is a system and method that allows real-time processing of child OPOI and rider service alarms from a parent OPOI that determines if one or more STS-1 alarms are associated with the rider service, the child OPOI, or the parent OPOI. This would provide needed maintenance capabilities for an IXC to confidently deploy a cascading OPOI by having the service alarm location incorporated in a maintenance ticket or report. Operations personnel can quickly remedy the facility/circuit experiencing trouble instead of spending hours trouble shooting the optical carrier to find which component is failing.

SUMMARY OF THE INVENTION

The inventors have discovered that it would be desirable to have a system and method that allows real-time processing of child OPOI and rider service alarms from a parent OPOI which determines if one or more STS alarms are associated with a rider service, a child OPOI, or a parent OPOI. The system and method performs in real-time processing intervals required for alarm surveillance in a telecommunications network. Methods correlate and analyze the STS alarms to see if the alarm is associated with a cascading OPOI (either the parent OPOI or child OPOI) or an individual rider service that is employing optical access.

One aspect of the invention provides a method for processing child OPOI and rider service alarms from a parent OPOI in an IXC network in real-time to determine if one or more STS-1 alarms are associated with the rider service, the child OPOI, or the parent OPOI. Methods according to this aspect of the invention include acknowledging a problem manifest on a DS3 or STS-N transported in a SONET Facility Network via an STS-1 alarm generated from an IXC SONET NE that terminates the parent OPOI at an OPOI, querying a network inventory database for information regarding the STS-1 alarm, finding a parent OC-X facility OPOI from the STS-1 alarm information, finding children facilities associated with the parent OC-X OPOI facility, obtaining a facility/equipment layout for each child facility and identifying which child facility the STS-1 alarm is associated with, and if the STS-1 alarm is associated with a DS3 or STS-Nc, declaring the problem at the identified child's facility, if not, the STS-1 alarm is associated with an STS-N custom circuit or level-1 STS-N cascading OPOI.

Another aspect of the method is setting a predetermined time window to observe if other STS-1 alarms arrive from the IXC SONET NE that terminates the parent OPOI, and if additional STS-1 alarms are observed within the predetermined time window, issuing a report indicating that the identified STS-N transport failed.

Another aspect of the method is if no other STS-1 alarms arrive and if the STS-N is a cascading OPOI, an individual rider service is experiencing the problem.

Another aspect of the method is querying the network inventory database for Common Language Facility Identifiers (CLFIs) for children facilities on the level-1 cascading OPOI and their facility layouts, if there are STS-1 alarms associated with DS3 or STS-Nc, declaring the problem at the children facility, if there are no STS-1 alarms associated with DS3 or STS-Nc and if STS-1 alarms are associated with an STS-N and all N STS-1 alarms are observed, declaring the problem at the STS-N facility, and if there are no STS-1 alarms associated with DS3 or STS-Nc and if there are no STS-1 alarms associated with an STS-N and not all N STS-1 alarms are observed, declaring the problem at the STS-N with not all STS-1 alarms observed.

The details of one or more embodiments of the invention are set forth in the accompanying drawings and the description below. Other features, objects, and advantages of the invention will be apparent from the description and drawings, and from the claims.

DETAILED DESCRIPTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting and coupling. Further, "connected" and "coupled" are not restricted to physical or mechanical connections or couplings.

The invention is not limited to any particular software language described or implied in the figures. A variety of alternative software languages may be used for implementation of the invention. Some components and items are illustrated and described as if they were hardware elements, as is common practice within the art. However, various components in the method and apparatus may be implemented in software or hardware such as FPGAs, ASICs and processors.

Figure 1:
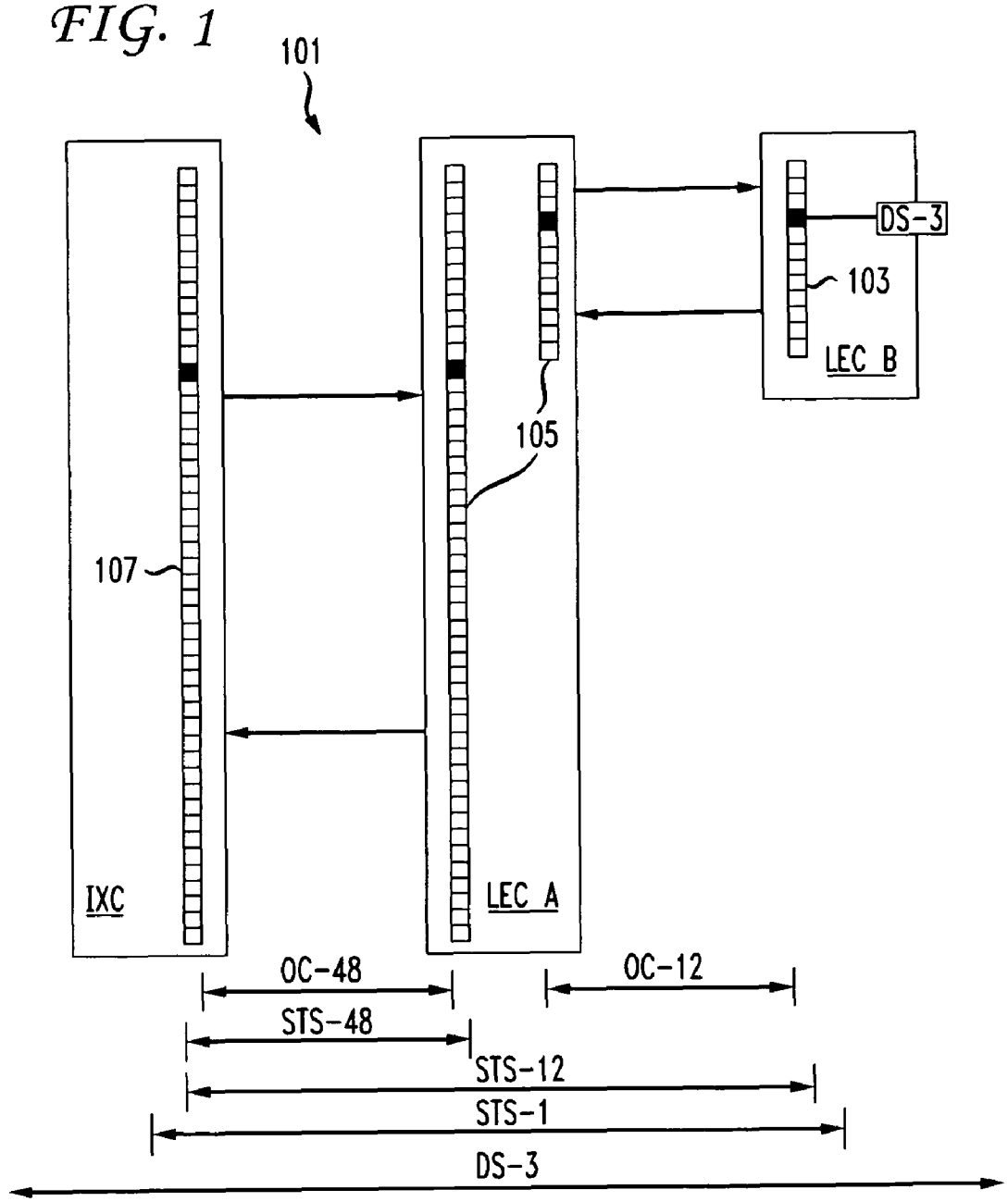
FIG. 1 is an exemplary cascading Optical Point of Interface (OPOI) architecture.

FIG. 1 shows a cascading OPOI architecture 101 that includes an IXC and two LEC central offices, LEC A and LEC B. At LEC B, a DS3 circuit is coupled to an STS-12 SONET NE such as a Multiplexer (Mux) or a SONET Add/Drop Multiplexer (ADM) 103. The DS3 circuit is mapped as an STS-1 in timeslot 4. The STS-12 is optical and is transported on an OC-12 line to LEC A. At LEC A, the OC-12 line is coupled to an STS-48 SONET NE such as a Mux or an ADM 105. The STS-12 is mapped into an STS-48 line in timeslot 13. The OC-12 timeslot 1 is mapped to OC-48 timeslot 13. The OC-48 is transported to the IXC over physical optical fiber and is coupled to an IXC STS-48 SONET NE such as a Mux or an ADM 107.

The STS-1 payload is designed to carry a full DS3 frame. When the DS3 frame enters a SONET network, path overhead is added and that SONET NE is a path generator and terminator. The SONET NE is line terminating if it processes the line overhead. Wherever the line or path is terminated, the section is terminated also. SONET regenerators terminate the section but not the paths or line.

When a DS3 problem is reported, it must be known to IXC maintenance that the STS-1 carrying the DS3 is on, for example, timeslot 13 of the OC-48 if the DS3 uses STS-1 timeslot 1 on the OC-12 child OPOI. Embodiments provide problem identification that does not require a maintenance technician to physically troubleshoot to find the location of the problem.

Embodiments of the invention are real-time troubleshooting frameworks for processing child OPOI and rider service alarms from a parent OPOI in an IXC network in real-time to determine if one or more STS alarms are associated with the rider service, the child OPOI, or the parent OPOI. The alarms are generated by the IXC SONET NE that terminates the parent OPOI. The alarms are transmitted to an Element Management System (EMS) associated with that SONET NE. The EMS transmits the alarm to an IXC Maintenance System which analyzes the alarm(s) using the system and method.

Figure 3:
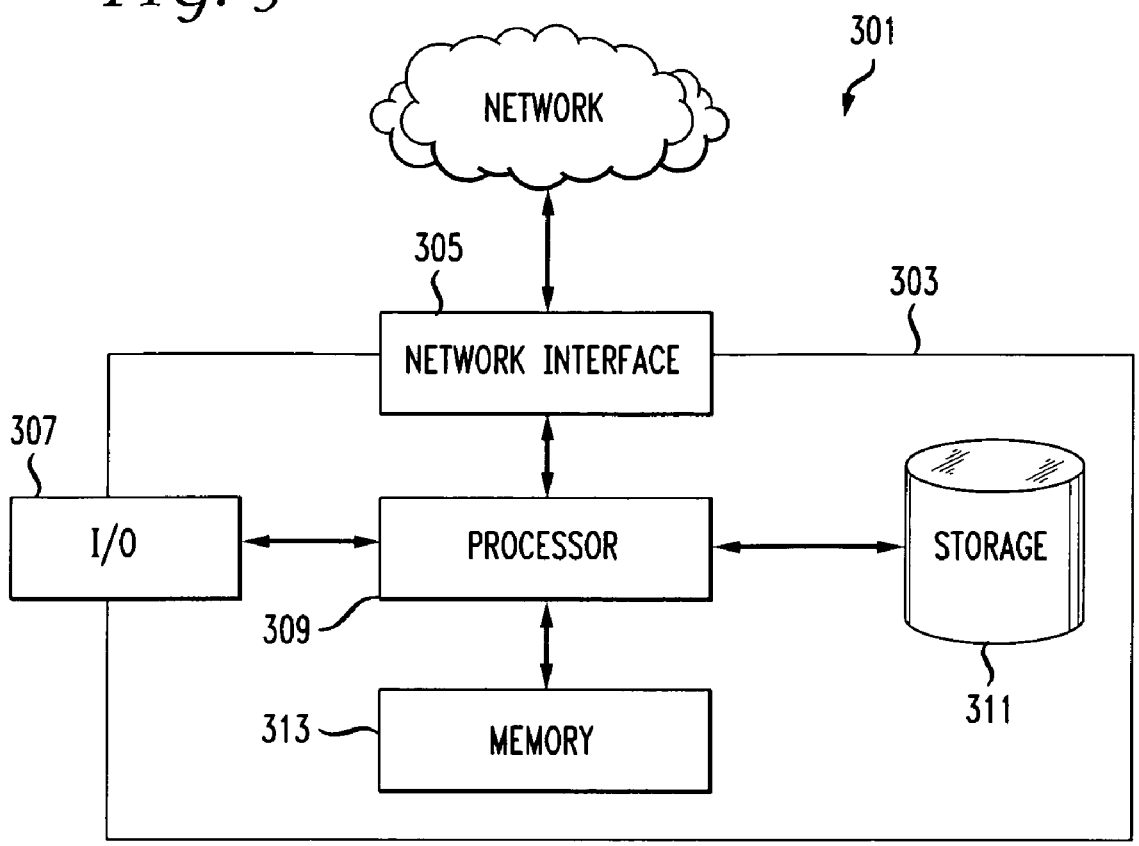
FIG. 3 is an exemplary alarm surveillance framework.

FIG. 3 shows a troubleshooting framework 301 for an IXC maintenance system. The framework 301 may be implemented as a computer using processors, memory, storage devices, software and other components. The computer 303 includes a network interface 305, I/O 307, a processor 309, storage 311 and memory 313. The processor 309 is coupled to the network interface 305, I/O 307, storage 311 and memory 313 and controls the overall operation of the computer 303 by executing instructions defining the troubleshooting configuration. The instructions may be stored in the storage device 311, for example, a magnetic disk, and loaded into the memory 313 when executing the configuration. The invention may be implemented as an application defined by the computer program instructions stored in the memory 313 and/or storage 311 and controlled by the processor 309 executing the computer program instructions. The computer 303 also includes at least one network interface 305 coupled to and communicating with a network such as partially shown in FIG. 1 to interrogate and receive alarm and database information. The I/O 307 allows for user interaction with the computer 303 via peripheral devices such as a display, a keyboard, a pointing device, and others.

Figure 2:
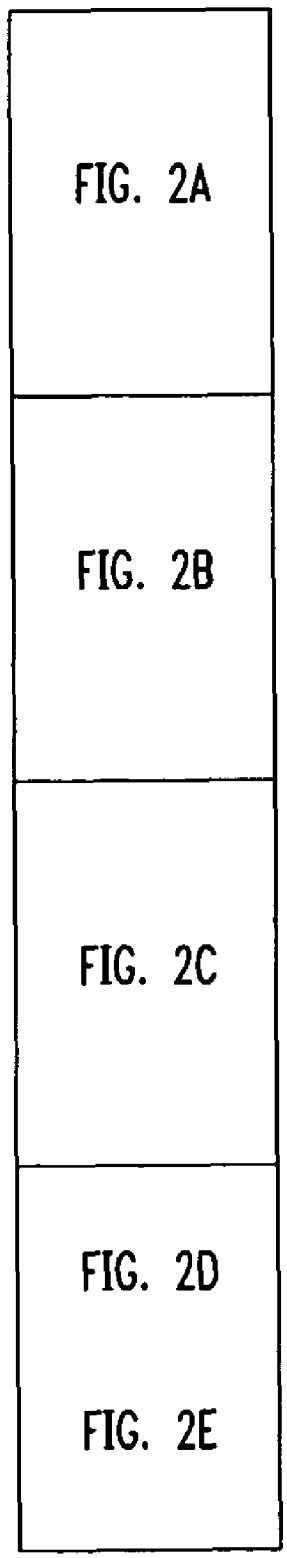
FIGS. 2-2E show an exemplary alarm surveillance method.
Figure 2A:
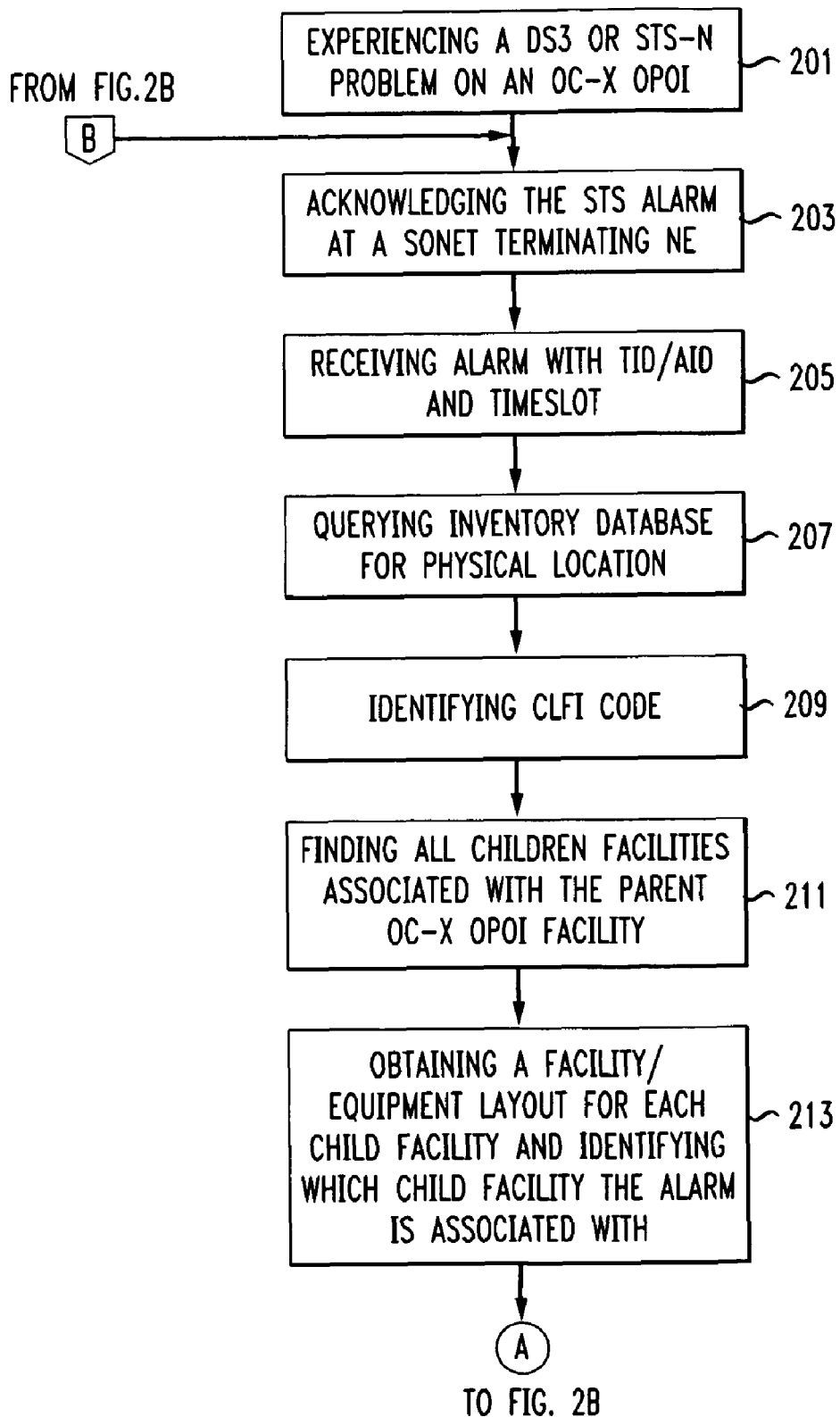
Figure 2B:
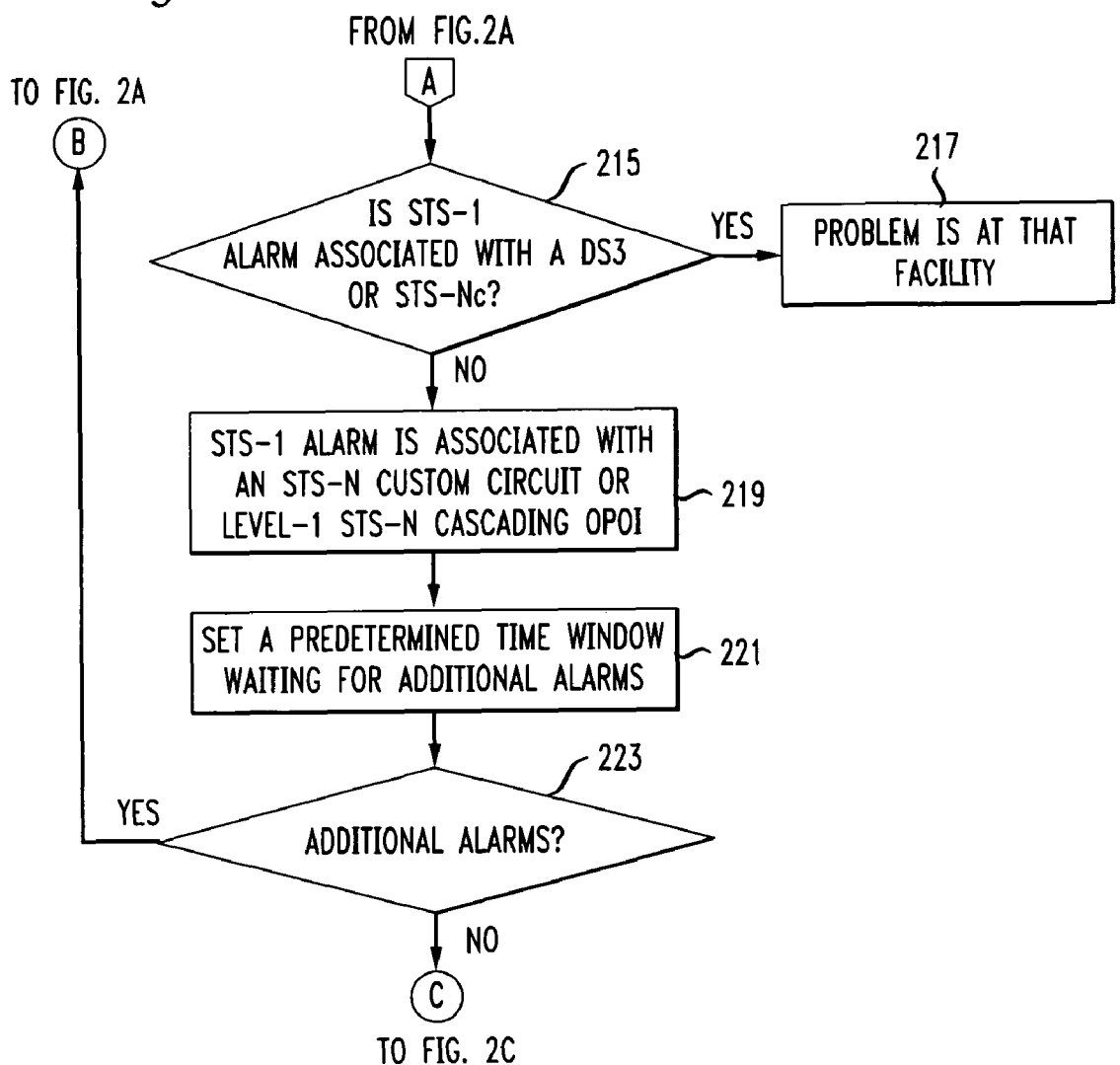
Figure 2D:
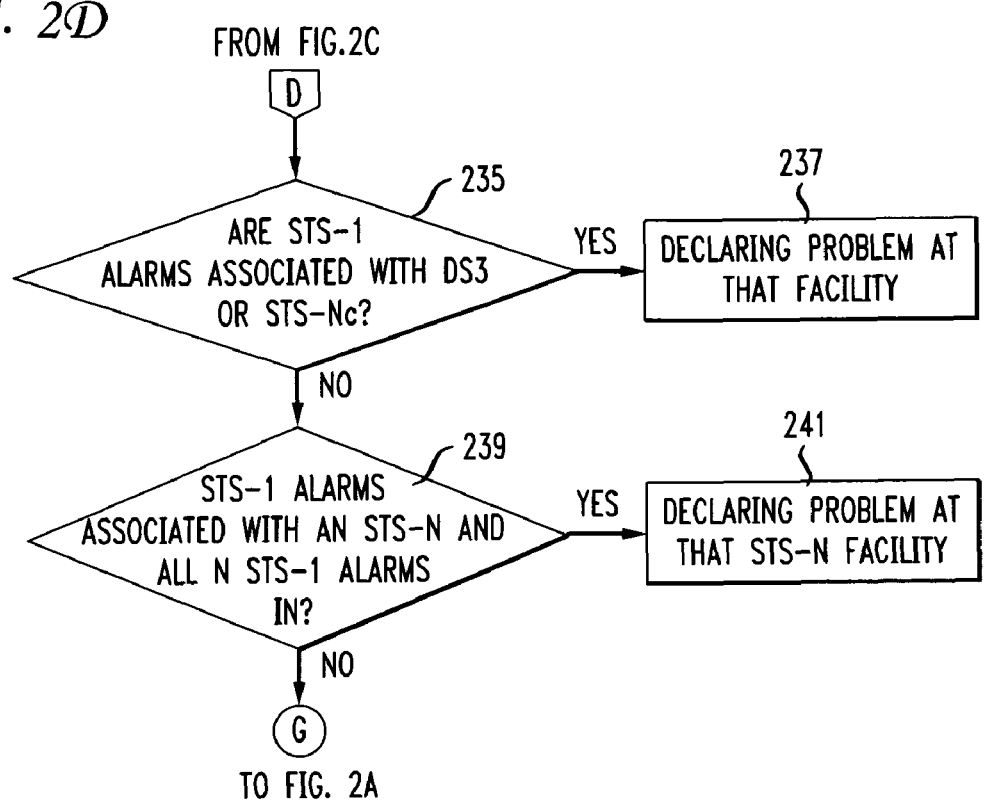
Figure 2E:
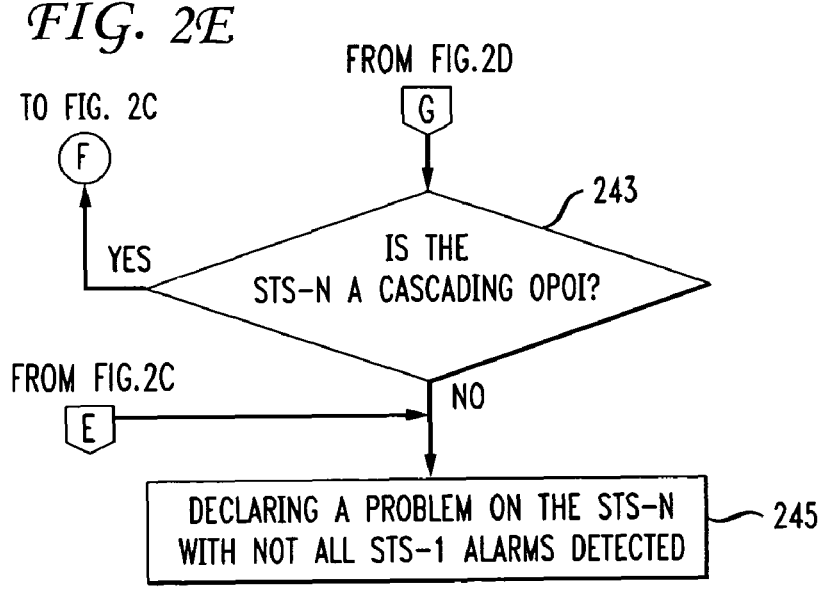

FIGS. 2-2E show the method of acknowledging and responding to alarms associated with cascading OPOIs. A problem on a DS3 or STS-N rider service, the child OPOI, or the parent OPOI is experienced at an OC-X facility associated with a cascading OPOI to an LEC such as a cut fiber, an AP equipment failure, an IXC equipment failure, a Customer Premises problem, or other. The problem triggers an alarm (or alarms) in its respective STS-1 timeslot(s) on the OC-X OPOI at the IXC SONET NE that terminates the parent OPOI (step 201). An IXC OPOI terminating NE, for example, the OC-48 terminal, generates the STS-1 alarm from the IXC's perspective (step 203). The IXC relies on alarm information collected from IXC-owned SONET NEs.

The method receives the STS-1 alarm(s) from the IXC SONET NE via the EMS associated with the SONET NE with a Target Identifier (TID)/Access Identifier (AID)/timeslot for each alarm (step 205). A query of an inventory OS database is performed. The IXC's OS architecture determines the number of OS databases. There may be separate Maintenance and Inventory OSs. Inventory databases may be located in a Maintenance Operation System (OS) which may be located in an IXC's Data Center. The Maintenance OS performs a real-time query on the Inventory OS. The query using the TID/AID/timeslot associated with the IXC SONET NE that terminates the parent OPOI is performed to ascertain a facility identifier associated with the STS-1 alarm (step 207). The inventory OS database response is a Common Language Facility Identifier (CLFI) that is assigned to that TID/AID/ timeslot at provisioning time (step 209). CLFI codes include data elements that identify a facility's designation and type as well as the channel, or pair number, and incorporate Common Language Location Codes (CLLI) codes to indicate a facility's end locations. The parent OC-X, OC-48 OPOI CLFI is found such as shown in FIG. 1.

The method queries the inventory OS database for all of the children facilities (return CLFI of each child facility) on the parent OC-X OPOI facility. When a child OPOI or rider STS-N is designed, it is assigned an STS timeslot(s) on the OPOI. This information is kept in the inventory OS as part of the provisioning process (step 211). The maintenance OS retrieves the STS-1 alarms from the IXC NE via the EMS. But there may be ambiguity in interpretation if the OPOI is a cascaded OPOI. Therefore, the maintenance OS queries the inventory OS to retrieve the possible facilities, such as rider services, child OPOI, and others, associated with the alarms. The method includes searching for additional STS-1 alarms within a certain time interval, these alarm(s) are associated with a rider service at a child OPOI. For each child facility CLFI returned from the query, the inventory OS database is again queried for their facility/equipment layout plan. There is an indicator in the layout that a given child CLFI is a child OPOI on the cascaded OPOI. A determination is made of which child facility the STS-1 alarm received at the TID/AID/timeslot level is associated with (step 213).

If an STS-1 alarm is associated with a DS3 or a Concatenated Synchronous Transport Signal Level N (STS-Nc) as given by the CLFI Type in the child CLFI, an alarm is declared at that facility. The facility, the DS3 or STS-Nc, the alarm info is from the IXC SONET NE that terminates the OPOI, while the lower level facilities go over other parent facilities (e.g., in the AP), all that is needed is alarm information from the single IXC SONET NE that terminates the OPOI (steps 215, 217).

If the STS-1 alarm is not associated with a DS3 or an STS-Nc, the STS-1 alarm at this level is associated with an STS-N customer circuit or a level-1 STS-N cascading OPOI. A level-1 cascading OPOI is a cascading OPOI on the top most parent OPOI which has a physical termination on the IXC SONET NE (steps 215, 219). It is the latter if there is an indicator that the child STS-N facility is a cascading OPOI.

Since the STS-1 is associated with a level-1 STS-N, the size of the STS-N (the number of STS-1's transported) and the start and end timeslots on the parent OPOI parent CLFI is determined. The STS-N or child OPOI are on certain STS-1 timeslots on the parent OPOI. These timeslots are associated with a TID/AID/timeslot on the IXC SONET NE. A predetermined time window is set to observe if the expected additional STS-1 alarms, associated with the STS-N or child OPOI, arrive (steps 221, 223). The processing of additional STS-1 alarms repeats steps 203 through 223.

If a predetermined time window is opened for a given child facility, another time window is not opened when additional STS-1 alarms arrive. Only when the original time window expires will another time window be opened for that STS-N facility CLFI or child OPOI. The STS-N or child OPOI may generate "N" STS-1 alarms within a short time interval. Therefore the receipt of the first STS-1 alarm is used as a trigger to open the time window. A time window is to be opened once, not each time an STS-1 alarm arrives. If the latter was performed, the time window would be too large.

Before the time window expires, if additional alarms are received associated with all of the STS-1's in the STS-N or child OPOI transport, the STS-N or child OPOI transport has failed. A report is issued regarding the problem including the examination steps identifying the associated STS-N or child OPOI facility (steps 225, 227).

If not all of the STS-1 alarms associated with the STS-N are received, and if the STS-N is a cascading OPOI (step 229), after the time window expires, if all of the STS-1's alarms have not been received in this cascading OPOI, the cascading OPOI is not experiencing problems but the problem alarm is with the individual rider service or a child cascading OPOI on the child OPOI (a level-2 cascading OPOI) (step 231). An inventory query of the database with the CLFI of the level-1 cascading OPOI is performed to obtain all the child facilities on the level-1 cascading OPOI. Using the retrieved child CLFIs, maintenance OS retrieves the facility layout of the "children facilities" (step 233).

A determination is made which child facility is associated with the STS-1's observed in the time window. To make this association, the child facility "STS-1 timeslot" on the facility layout which is relative to the level-1 cascading OPOI is translated to the absolute STS-1 timeslot on the "top most parent OPOI". For the case of a rider service on a level-1 cascading OPOI, the STS-1 timeslots of the level-1 STS-N cascading OPOI on the top most parent OPOI are known. The STS-1 timeslots may be, for example, slots "M" to "M+n−1". The slot "P" on the level-1 cascading OPOI is slot "M+P−1" on the "top most parent OPOI". M, n and P are STS-1 timeslots on the OC-Xs. For example, for an OC-48, M, n and P may be a value from 1 to 48. With the alarm information received, the TID/AID/timeslot, where the timeslot is an STS-1 timeslot on the "parent facility", is relative to the parent OPOI. The rider services associated with a child OPOI have timeslot information inventories relative to the child OPOI. Therefore the maintenance OS may need to perform a translation to determine what entity is experiencing problems. For example, if the parent OPOI is an OC-48 and there is an OC-12 child OPOI where the child OPOI uses timeslots 13 to 24 on the parent OPOI and the child OPOI has a DS3 rider service, the inventory OS will know what timeslot on the parent OPOI the DS3 uses. For example, it may be timeslot number 3. But if the DS3 initiates an alarm to be reported by an IXC SONET NE, it may be on slot 15 on the OC-48. The maintenance OS needs to map "OC-48 OPOI timeslot 15" to "OC-12 OPOI timeslot 3".

If the STS-1 alarms are associated with a DS3 (there would be only one STS-1 alarm in this case), or an STS-Nc (as given by the Facility Type in the child CLFI), an alarm is declared at that facility (steps 235, 237). The alarm processing associated with rider services and child OPOI for the "top-most parent OPOI" identifies the facility.

If the STS-1 alarms are associated with an STS-N, and all "N" STS-1 alarms are observed, a problem is declared at that STS-N facility (steps 239, 241).

If the STS-1 alarms are associated with an STS-N, and all "N" STS-1 alarms are not observed, if the STS-N is a cascading OPOI, the method repeats steps 233 through 243. This indicates that the STS-N is a cascading OPOI of one more level. If the problem dealt with a level-1 cascading OPOI, this indicates a level-2 cascading OPOI or a rider service on the "Level 1 child OPOI". The processing of a level-2 cascading OPOI can lead to processing a level-3 cascading OPOI.

If not all of the STS-1 alarms associated with the STS-N are received, and if the STS-N is not a cascading OPOI, a problem is declared at the STS-N facility but with an indication that not all expected STS-1 alarms were detected (step 245).

One or more embodiments of the present invention have been described. Nevertheless, it will be understood that various modifications may be made without departing from the spirit and scope of the invention. Accordingly, other embodiments are within the scope of the following claims.

What is claimed is:

1. A method for processing child Optical Point of Interface (OPOI) and rider service alarms from a parent OPOI in an IntereXchange Carrier (IXC) network in real-time to determine if one or more Synchronous Transport Signal 1 (STS-1) alarms are associated with the rider service, the method for processing the child OPOI, or the parent OPOI comprising:

acknowledging a problem manifest on a Digital Signal 3 (DS3) or STS-N transported in a SONET Facility Network via an STS-1 alarm generated from an IXC SONET Network Element (NE) that terminates the parent OPOI at an OPOI;

querying a network inventory database for information regarding the STS-1 alarm;

finding a parent Optical Carrier-X (OC-X) facility OPOI from the STS-1 alarm information;

finding children facilities associated with the parent OC-X OPOI facility;

obtaining a facility/equipment layout for each child facility and identifying which child facility the STS-1 alarm is associated with; and if the STS-1 alarm is associated with a DS3 or Synchronous Transport Signal N, concatenated (STS-Nc), declaring the problem at the identified child's facility, if not, the STS-1 alarm is associated with an STS-N custom circuit or level-1 STS-N cascading OPOI.

2. The method according to claim 1 further comprising:
setting a predetermined time window to observe if other STS-1 alarms arrive from the IXC SONET NE that terminates the parent OPOI; and
if additional STS-1 alarms are observed within the predetermined time window, issuing a report indicating that the identified STS-N transport failed.

3. The method according to claim 2 wherein if no other STS-1 alarms arrive and if the STS-N is a cascading OPOI, an individual rider service is experiencing the problem.

4. The method according to claim 3 further comprising:
querying the network inventory database for Common Language Facility Identifiers (CLFIs) for children facilities on the level-1 cascading OPOI and their facility layouts;
if there are STS-1 alarms associated with DS3 or STS-Nc, declaring the problem at the children facility;
if there are no STS-1 alarms associated with DS3 or STS-Nc and if STS-1 alarms are associated with an STS-N and all N STS-1 alarms are observed, declaring the problem at the STS-N facility; and
if there are no STS-1 alarms associated with DS3 or STS-Nc and if STS-1 alarms are associated with an STS-N and not all N STS-1 alarms are observed, declaring the problem at the STS-N with not all STS-1 alarms observed.

5. The method according to claim 1 wherein acknowledging the STS-1 alarm further comprises receiving the alarm with a Target Identifier (TID)/Access Identifier (AID) and a timeslot number.

6. The method according to claim 5 further comprising translating child facility STS-1 timeslots relative to the cascading OPOI to the absolute STS-1 timeslot on the top most parent OPOI.

7. The method according to claim 1 wherein querying the network inventory database further comprises obtaining CLFI codes.

8. A non-transitory computer readable medium having recorded thereon a computer program comprising code means for, when executed on a computer, instructing the computer to control steps in a method for processing child Optical Point of Interface (OPOI) and rider service alarms from a parent OPOI in an IntereXchange Carrier (IXC) network in real-time to determine if one or more Synchronous Transport Signal 1 (STS-1) alarms are associated with the rider service, the method for processing the child OPOI, or the parent OPOI comprising:

acknowledging a problem manifest on a Digital Signal 3 (DS3) or STS-N transported in a SONET Facility Network via an STS-1 alarm generated from an IXC SONET Network Element (NE) that terminates the parent OPOI at an OPOI;

querying a network inventory database for information regarding the STS-1 alarm;

finding a parent Optical Carrier-X (OC-X) facility OPOI from the STS-1 alarm information;

finding children facilities associated with the parent OC-X OPOI facility;

obtaining a facility/equipment layout for each child facility and identifying which child facility the STS-1 alarm is associated with; and if the STS-1 alarm is associated with a DS3 or Synchronous Transport Signal N, concatenated (STS-Nc), declaring the problem at the identified child's facility, if not, the STS-1 alarm is associated with an STS-N custom circuit or level-1 STS-N cascading OPOI.

9. The non-transitory computer readable medium according to claim 8 further comprising:
setting a predetermined time window to observe if other STS-1 alarms arrive from the IXC SONET NE that terminates the parent OPOI; and
if additional STS-1 alarms are observed within the predetermined time window, issuing a report indicating that the identified STS-N transport failed.

10. The non-transitory computer readable medium according to claim 9 wherein if no other STS-1 alarms arrive and if the STS-N is a cascading OPOI, an individual rider service is experiencing the problem.

11. The non-transitory computer readable medium according to claim 10 further comprising:
querying the network inventory database for Common Language Facility Identifiers (CLFIs) for children facilities on the level-1 cascading OPOI and their facility layouts;
if there are STS-1 alarms associated with DS3 or STS-Nc, declaring the problem at the children facility;
if there are no STS-1 alarms associated with DS3 or STS-Nc and if STS-1 alarms are associated with an STS-N and all N STS-1 alarms are observed, declaring the problem at the STS-N facility; and
if there are no STS-1 alarms associated with DS3 or STS-Nc and if STS-1 alarms are associated with an STS-N and not all N STS-1 alarms are observed, declaring the problem at the STS-N with not all STS-1 alarms observed.

12. The non-transitory computer readable medium according to claim 8 wherein acknowledging the STS-1 alarm further comprises receiving the alarm with a Target Identifier (TID)/Access Identifier (AID) and a timeslot number.

13. The non-transitory computer readable medium according to claim 8 wherein querying the network inventory database further comprises obtaining CLFI codes.

14. The non-transitory computer readable medium according to claim 12 further comprising translating child facility STS-1 timeslots relative to the cascading OPOI to the absolute STS-1 timeslot on the top most parent OPOI.

* * * * *